Patented Dec. 28, 1926.

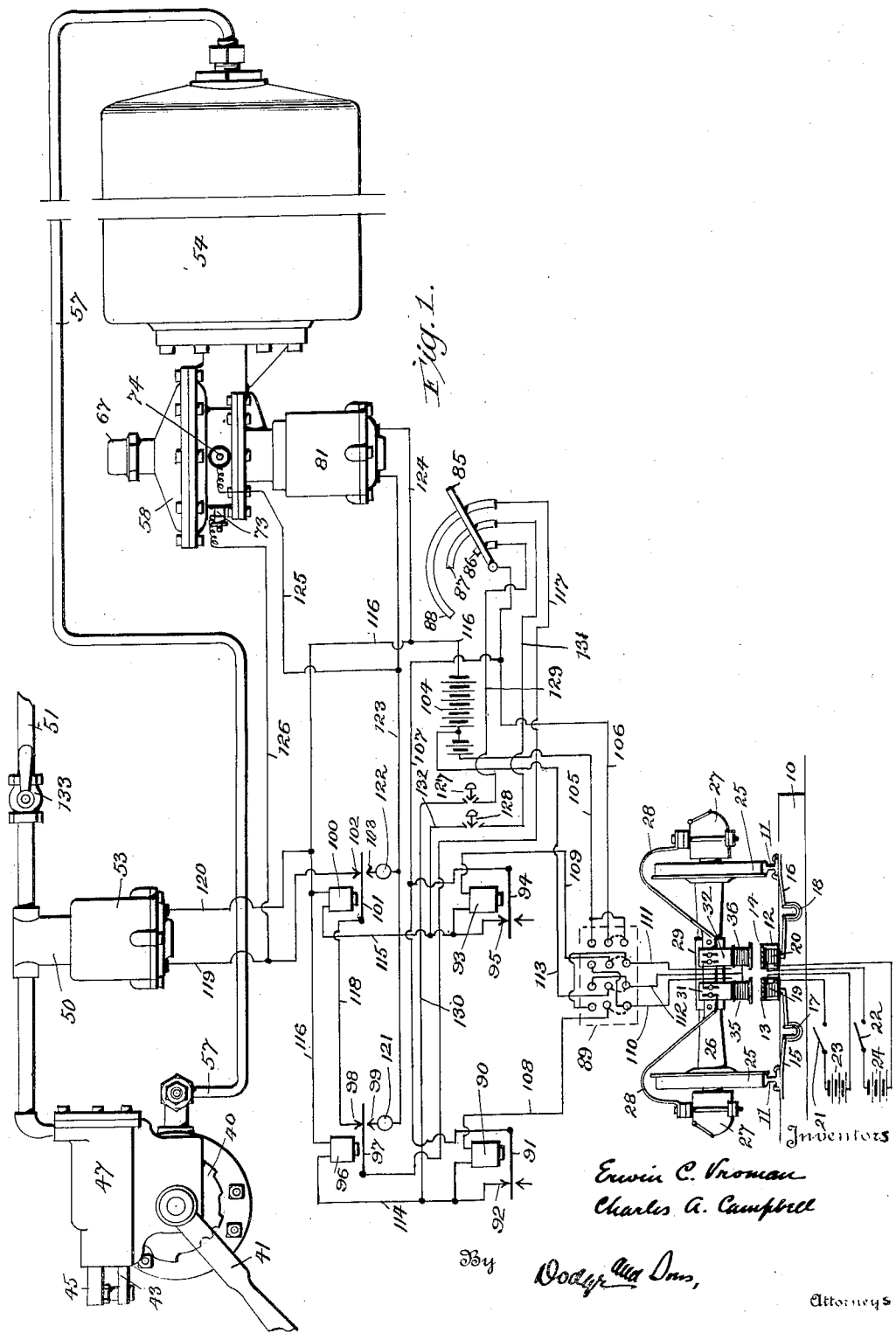

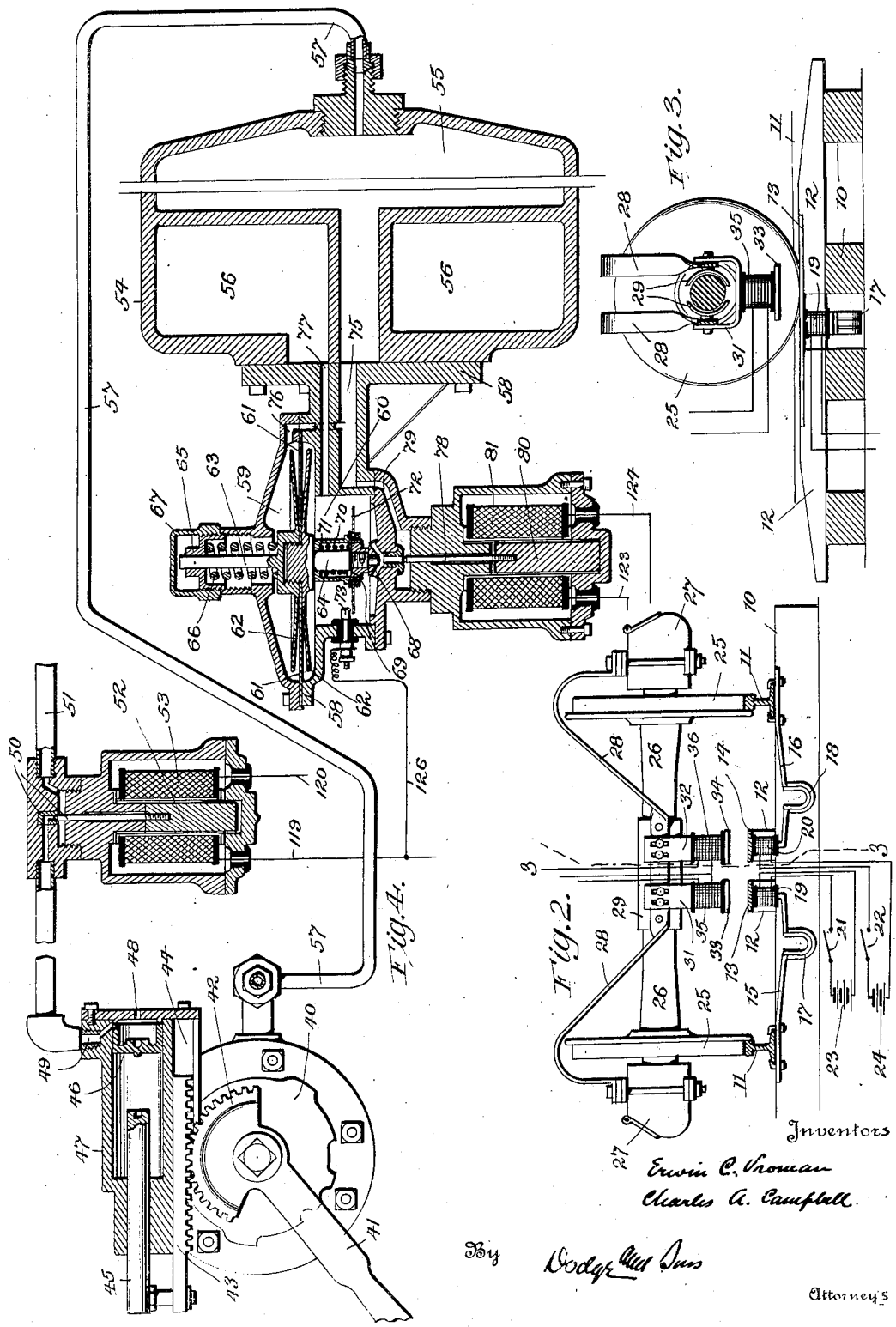

1,612,333

UNITED STATES PATENT OFFICE.

ERWIN C. VROMAN AND CHARLES A. CAMPBELL, OF WATERTOWN, NEW YORK, ASSIGNORS TO THE NEW YORK AIR BRAKE COMPANY, A CORPORATION OF NEW JERSEY.

TRAIN CONTROL.

Application filed December 24, 1923. Serial No. 682,423.

This invention relates to train control systems and is illustrated as embodied in a system of the inductive impulse type, though capable of embodiment in systems in which the controlling interaction between the track and train is by other than inductive means. Among the known means for performing this function are ramps, electric contacts, etc.

The present system not only controls the entrance of a train into caution and danger blocks, but controls it in accordance with train speed. The complete system involves control of maximum train speed, control of speed of entrance into a caution block, control of speed of entrance into a danger block, and includes means by which the engineer is permitted to limit the intensity of a brake application automatically produced under certain conditions, but is not permitted to prevent such an application if, nor to release it so long as, the speed is above values chosen as safe for the particular conditions whose existence automatically causes the device to function. The system is intended to operate in conjunction with ordinary block signal systems.

The device limits the speed of the train to any chosen maximum, for example 60 miles per hour. If this maximum be exceeded a service brake application is made automatically and can be released only after the speed has been reduced to such maximum. The engineer cannot limit the brake pipe reduction which produces the application, as the engineer's valve is held in service position until the speed is reduced to the chosen maximum. When it is so reduced, he may release the brakes.

At a caution indication, provided the speed is above a fixed value, which is hereinafter called the "caution limit," a brake application is made automatically. The caution limit should ordinarily be about thirty miles per hour. In the case of an application caused by a caution indication, the engineer may at his option limit the brake pipe reduction to a fixed amount, determined by the adjustment of the device, but cannot release the brakes until the speed is reduced to the caution limit.

At a stop indication, provided the speed is above a fixed value, which is hereinafter called the "danger limit," a brake application is made automatically. A suitable danger limit is about ten miles per hour. In the case of an application caused by a stop indication, the engineer may at his option limit the brake pipe reduction to a fixed amount, but cannot release the brakes until the speed is reduced to the danger limit.

The train may pass a caution signal at a speed below the caution limit or a danger signal at a speed below the danger limit, provided the engineer shall, at the time of passing, acknowledge the respective signals by operating a corresponding hold-out device which in the case of the inductive apparatus takes the form of a reset switch. If it is desired to compel a full stop on a danger signal, the corresponding reset switch is so located that it cannot be reached while the train is in motion.

The preferred embodiment of the invention as applied to a stop system of the inductive impulse type is illustrated in the accompanying drawings, in which:

Fig. 1 is a diagram of the complete system.

Fig. 2 is an enlarged view showing the mode of mounting the inductive elements.

Fig. 3 is a section on the line 3—3 of Fig. 2.

Fig. 4 is a plan view of the engineer's valve, showing in section the valve operating motor and the magnet valve for controlling said motor, as well as the means for permitting the engineer to limit the brake pipe reduction.

Referring first to Figs. 1, 2, and 3, the inductive apparatus for transmitting actuating impulses from stations on the track to the train by induction will first be described. Since both caution and danger signals must be transmitted, this apparatus is constructed in duplicate, and since the train may be headed in either direction on the track, a reversing switch is provided on the train to permit the train-carried apparatus to be connected in proper relation to the track. In discussing Figs. 1, 2, and 3, it will be assumed that this switch is so set that the left hand track elements actuate the left hand set of relays (the danger relays) on the train and the right hand track elements the right hand relays (the caution relays).

Ties are indicated at 10 and track rails at 11. These are of any usual type and may be part of the track circuits of known block signal systems. Mounted on the ties 10 are four supporting timbers 12 alined in pairs parallel with the rails 11. The adjacent ends of each pair are spaced apart to leave an interval for a core and winding hereinafter described and the opposite ends are tapered, as clearly shown in Fig. 3, to deflect any pendant equipment carried by the train which might otherwise cause damage.

At their adjacent ends the tops of timbers 12 are gained out to receive flush with their top surfaces elongated pole pieces 13 and 14, one for each pair of timbers. The left hand pole piece 13 is connected by a core 15, including a permanent magnet 17, with the left hand track rail 11, and the right hand pole piece 14 is connected by a core 16, including a permanent magnet 18, with the right hand track rail 11. All the pole pieces and cores are of magnetic material to afford goods paths for magnetic flux from each rail 11 to the corresponding pole piece 13 or 14 as the case may be.

Between, and protected by the ends of the timbers 12 are windings 19 and 20. The winding 19 on core 15 is in circuit with a battery 23 and this circuit is controlled by switch 21, which is so arranged as to be opened by the block signal system (not shown) when said system gives a caution indication. Similarly the winding 20 on core 16 is in circuit with a battery 24 and this circuit is controlled by a switch 22 which is so arranged as to be opened by the block signal system when said system gives a danger (stop) indication. Both switches 21 and 22 are closed when the block signal system gives a clear indication.

When excited, the windings 19 and 20 neutralize the fields otherwise created by the respective permanent magnets 17 and 18.

The train carried elements to which the track elements just described impart inductive impulses upon the passage of the train are preferably so arranged in connection with one set of truck wheels that these wheels are caused to offer a good magnetic circuit.

Said truck wheels are indicated at 25, 25, and are rigidly connected by the usual axle 26 on which they are fixed. The journal boxes are shown at 27, 27 and are of usual form. Two yokes 28 are supported on the tops of the boxes 27, one forward and the other to the rear of the center line of the axle 26. These arch over the wheels 25 and at their middles extend on opposite sides of the middle portion of axle 26. Here they carry the two iron segments 29, 29 which partly surround axle 26 and are spaced therefrom only a short distance so as to offer the smallest practicable air gaps.

Two stirrup irons 31, 32 are suspended from the yokes 28, and carry pendant cores which terminate in enlarged pole pieces 33, 34. Each of these cores is provided with a corresponding winding 35, 36, connected with train carried relays.

The track equipment is located only at points where it is desired to transmit a control actuating impulse to the train. At such points a good magnetic path is afforded through both the track and train coils. For the left hand coils, for example, it is as follows: pole piece 33, stirrup 31, segment 29, axle 26, left wheel 25 and rail 11, core 15 to pole piece 13. The air gap between 13 and 33 is adjusted by adjusting stirrup 31, four inches being satisfactory.

Windings 35 and 36 are constantly excited. Under clear conditions windings 19 and 20 are energized and when the train passes, no impulse is induced in windings 35 or 36 such as would operate the relays hereinafter described. Under caution or danger conditions coil 19 or 20 is open circuited and the field created by the corresponding permanent magnet 17 or 18 is effective to induce a reverse impulse in the corresponding coil 35 or 36 and thus actuate the corresponding relay.

Before discussing the relays actuated by the impulses generated in coils 35 and 36, and the connecting circuits, it is desirable to describe the construction and operation of the brake applying mechanism. This is best shown in Fig. 4.

An engineer's valve of the usual equalizing discharge type is indicated at 40. The handle 41 is provided with a sector gear 42 which meshes with a sliding rack 43. The rack 43 slides in a guide 44 and is connected with a piston rod 45. The rod 45 is arranged to be forced to the left by a piston 46 working in a cylinder 47, and the parts are so dimensioned that at the left hand limit of motion of the piston 46, the valve handle 41 will be in service application position. From this position it can of course be moved further manually.

The space to the right of piston 46 is vented to atmosphere by means of a minute port 48 whose size is such as to relieve the piston 46 of actuating pressure only when the pressure supply is cut off. Pressure fluid is admitted through port 49 under the control of valve 50 from main air reservoir connection 51. The valve 50 is connected to an armature 52 which closes the valve 50 when the winding 53 is excited.

Since the engineer's valve 40 is of the equalizing discharge type it is necessarily equipped with an equalizing reservoir to give the required volume in communication with the space above the equalizing piston (not shown). Instead of the conventional reservoir, a shell 54 is used, subdivided into a large chamber 55, the volumetric equivalent of the usual equalizing reservoir, and a much smaller chamber 56. The chamber 55 is connected to the space above the equalizing discharge piston by pipe 57.

A shell 58 mounted on shell 54 is divided into two spaces 59 and 60 by a flexible diaphragm 61. The diaphragm 61 is clamped between convex plates 62 which have an upward-extending stem 63 and a downward extending stem 64. The stem 63 is guided in adjustable spring seat 65 and is surrounded by a coil spring 66 which is stressed to resist a differential pressure on diaphragm 61 corresponding to the desired limitation of brake pipe reduction. The spring seat 65 is threaded in shell 58 and is locked by cap nut 67.

The stem 64 is guided at 68 and carries a spring seat 69. Surrounding stem 64 above seat 69 is a spring 70 which urges upward a sleeve 71. The sleeve 71 carries, insulated from itself a disc 72 which in the upward position of diaphragm 61, bridges contact 73 and a similar contact 74 (see Fig. 1). The spring 70 assures firm contact.

The space 59 is constantly in communication with chamber 55 by way of ports 75, 76, while space 60 is constantly in communication with chamber 56 by way of port 77. A valve 78 controls a port 79 which when open connects port 75 and space 60, establishing a connection between chambers 55 and 56. Valve 78 is actuated by an armature 80, being held closed when winding 81 is excited.

To explain the function of the parts without going into details of circuits, it is premised that under normal (clear) conditions coil 53 is excited and coil 81 is inert and that the circuit through contacts 73 and 74 is a shunt which may excite coil 53 after it has been rendered inert by the automatic control mechanism. If the engineer's valve be in running position, chambers 55 and 56 will be charged to brake pipe pressure.

Under such conditions assume the control mechanism functions. Its effect is to deenergize coil 53 and excite coil 81. This admits main reservoir air against piston 46 and isolates chamber 55 from chamber 56. Piston 46 moves the rotary valve of the engineer's brake valve to service position, venting air from the equalizing reservoir. When the pressure in 55 drops below the pressure in 56 (brake pipe pressure) an amount determined by the setting of spring 66 (about 15 pounds per square inch reduction is satisfactory), contact 72 will connect contacts 73 and 74 exciting coil 53 and permitting the engineer to move the valve to lap position to close the rotary valve. The engineer need not do so, and if he does not, a full service application will be made. Should he attempt to release the brakes the resulting destruction of the pressure differential between chambers 55 and 56 will open the circuit at 72, deenergizing coils 53 and causing piston 46 to move the engineer's brake valve back to service position.

The system also includes a train speed controlled switch whose exact form is immaterial, as many forms capable of performing the function are familiar to those skilled in the art. This switch is therefore shown only diagrammatically (Fig. 1). It includes an arm 85 which moves counter-clockwise as train speed increases, such movement being caused by a centrifugal mechanism driven by a wheel of the train. When the train is at rest, and up to the danger limit, it is in contact with three arcuate contacts 86, 87, and 88, which subtend different angles.

The contact 86 controls the reset circuit for the danger (stop) relay and is cleared by the arm 85 at the danger limit, so that above this speed the danger relay cannot be reset or prevented from acting. The contact 87 controls the reset circuit for the caution relay and is cleared by the arm 85 at the caution limit so that above this speed the caution relay cannot be reset or prevented from acting. The contact 88 controls the main exciting circuit of coil 53 and is cleared at the desired maximum speed, so that above this speed a brake application will be made.

The reversing switch previously mentioned is merely a four pole double throw switch illustrated in diagram in Fig. 1 at 89. The switch contacts, furthest to the right, control the main battery lead to the centrifugal switch arm 85. The remaining three sets of contacts control the connections to coils 35 and 36 (which have a common return wire) and the switch operates when thrown to its opposite positions to transpose the coils 35 and 36, so that either may be set to operate the caution and the other the stop relays at will. The circuits will be traced as they are when the middle contacts are connected with the lower contacts. The interchange effected by the switch will be obvious from the diagram.

Four relays are used, two being called primary relays, and two secondary relays. The primary relay armatures control the passage of current through their magnet coils, so these relays must be reset by closing special resetting circuits.

The secondary relays reset themselves, the circuits through their magnets not being controlled by their armatures. The primary danger relay has a coil 90, an armature 91, and contact 92. The primary caution relay has a coil 93, armature 94 and contact 95. The secondary danger relay has a coil 96, armature 97, and two contacts 98 and 99. The secondary caution relay has a coil 100, armature 101, and two contacts 102 and 103.

The source of energy is a storage battery 104 which may be maintained charged in any suitable manner. In order to secure different voltages from the battery, certain of the circuits are connected into the battery at a point intermediate its end terminals.

The exciting circuit for the primary relays is as follows: battery 104, wire 105, switch 89, wire 106, wire 107, thence in parallel via armatures 91, 94, contacts 92, 95, coils 90, 93, wires 108, 109, switch 89 (two contacts) wires 110, 111, coils 35, 36, to a common return wire 112 which leads through switch 89 to wire 113 to an intermediate terminal on battery 104. This gives low voltage excitation to coils 90, 35, 93, and 36. The secondary relay coils are connected in parallel circuits as follows: contacts 92, 95, wires 114, 115, coils 96, 100, to common return wire 116 leading to the terminal of battery 104. Thus the secondary relays are excited at full battery voltage, coil 96 being controlled by armature 91 and coil 100 by armature 94.

The circuit which normally excites magnet coil 53 is as follows: battery 104, wire 105, switch 89, wire 106, centrifugal switch arm 85, speed limiting contact 88, wire 117, armature 97, contact 98, wire 118, armature 101, contact 102, wire 119, coil 53, wire 120, wire 116 to battery 104. This subjects the excitation of coil 53 concurrently to independent control by speed control switch arm 85, armature 97 and armature 101.

If either armature 97 or 101 drops as a result of deenergization of coil 96 or 100 respectively, circuits will be established alternatively as follows: battery 104, wire 105, switch 89, wire 106, arm 85, contact 88, wire 117, armature 97 (or 101) contact 99 (or 103), danger signal lamp 121 (or caution signal lamp 122) wire 123, coil 81, wire 124 to battery 104. A branch wire 125 leads from wire 123 to contact 74 and when contact 72 (Fig. 4) connects contact 74 with contact 73 a shunt circuit will be completed leading from contact 73 as follows: wire 126, wire 119, coil 53, wire 120, wire 116 to battery 104.

The resetting of primary relays 90 and 93 is effected by corresponding manually operable normally open reset switches 127 (danger reset switch) and 128 (caution reset switch) respectively. The circuits through these reset switches are respectively controlled by the speed controlled switch arm 85. The danger reset circuit is as follows: battery 104, wire 105, switch 89, wire 106, arm 85, contact 86, wire 129, switch 127, wire 130, coil 90, wire 108, switch 89, wire 110, coil 35, wire 112, switch 89, wire 113 to intermediate connection on battery 104. Similarly the caution reset circuit is as follows: battery 104, wire 105, switch 89, wire 106, arm 85, contact 87, wire 131, switch 128, wire 132, coil 93, wire 109, switch 89, wire 111, coil 36, wire 112, switch 89, wire 113 to intermediate connection on battery 104.

To cut the pneumatic system out of action a cock 133 is put on the main reservoir air connection 51. This may normally be sealed open, to guard against unauthorized closing.

The operative characteristics of the component elements of the system have been described and the operation of the system as a whole may be very briefly summarized.

If the maximum speed is exceeded, arm 85 leaves contact 88, interrupting the exciting circuit of coil 53, opening valve 50 and causing piston 46 to move valve handle 41 to service position and prevent its return. Since coil 81 is not excited under these conditions, diaphragm 61 cannot function and the engineer, therefore, is not enabled to limit the brake pipe reduction. A service application results as the brake valve must remain in service position until train speed is reduced to the maximum limit and arm 85 engages contact 88. The engineer may then release the brakes as valve 50 closes and motor cylinder 47 is vented at 48.

If an impulse is generated in either coil 35 or 36, in the manner described, the armature 91 or 94 of the corresponding primary relay will drop, causing deenergization of the corresponding secondary relay coil 96 or 100. The ensuing dropping of the armature 97 or 101 will light danger signal lamp 121 or caution signal lamp 103, deenergize coil 53 and energize coil 81. Thus diaphragm 61 becomes operative to reexcite coil 53 when the equalizing reservoir pressure is reduced by the chosen amount determined by the adjustment of spring 66. When this occurs, valve 50 closes and the engineer may lap the valve.

When, and only when, the train speed is below the danger limit, the engineer may prevent the danger primary relay 90 from functioning, or may reset it after it has functioned, by closing reset switch 127. This permits the engineer to pass a danger signal at a speed below the danger limit or to proceed without coming to a stop after an automatic application has reduced his speed below the danger limit, but requires action by the engineer and conscious recognition of the signal. The location of switch 127 in a position not accessible when the train is in motion will compel a full stop at all stop indications.

When, and only when, the train speed is below the caution limit, the engineer may prevent the caution primary relay 93 from functioning or may reset it after it has functioned by closing the reset switch 128. This permits the engineer to pass a caution signal at a speed below the caution limit, or to proceed without coming to a stop after an automatic application has reduced his speed below the caution limit. Here again the engineer is compelled to acknowledge the signal and take action.

What is claimed is:

1. In a train control mechanism, the combination of an engineer's valve of the equalizing discharge type including an equalizing reservoir; a motor serving when energized to shift said engineer's valve to service application position and prevent its return in releasing direction, a control device for controlling the energization of said motor; means for actuating said control device from stations along the track; and a pressure actuated device controlled by the pressure in said equalizing reservoir, rendered operative by the functioning of said actuating means upon said control device, and serving to deenergize said motor when said reservoir pressure is lowered a chosen amount.

2. In a train control mechanism, the combination of an engineer's valve of the equalizing discharge type including an equalizing reservoir; a motor serving when energized to shift said engineer's valve to service application position and prevent its return in releasing direction; a control device for controlling the energization of said motor; means for actuating said control device from stations along the track; means operated by said actuating means and arranged to confine a portion of the pressure fluid in said reservoir; and a device operated by the pressure differential between the confined fluid and the remaining fluid in the reservoir and serving to deenergize said motor when said differential exceeds a chosen value.

3. In a train control mechanism, the combination of an engineer's valve of the equalizing discharge type including an equalizing reservoir; a pressure motor serving when subject to pressure to move said engineer's valve to service application position and prevent its return in releasing direction; an electro-magnetically actuated valve normally excited to relieve said motor of pressure; switch means for destroying the excitation of said valve arranged for operation from stations along the track; electric valve means also operated by said switch means and when so actuated serving to confine a portion of the pressure fluid in said reservoir; an abutment subject to the opposed pressures of said confined fluid and the other fluid in said reservoir; and a switch arranged to be operated by said abutment and controlling an exciting circuit for said electro-magnetic valve.

4. The combination with a train control mechanism including automatic means for moving an engineer's equalizing discharge brake valve to service application position, of means for permitting the engineer to limit the brake pipe reduction resulting from such automatic action by moving the valve to lap position, said means comprising a pressure actuated device rendered operative by the automatic functioning of said train control mechanism, responsive to the pressure drop in the equalizing reservoir, and arranged to terminate the action of the brake valve shifting means without restoring the brake valve, upon the completion of a chosen pressure reduction in the equalizing reservoir.

5. The combination with a train control mechanism including automatic means for moving an engineer's equalizing discharge valve to service application position and thereafter preventing retrograde movement, of means for permitting the engineer to limit the brake pipe reduction resulting from such automatic action by moving said valve to lap position, said means comprising a device rendered active by the existence of reduced pressure in the equalizing reservoir and when active serving to suspend the action of said automatic means without restoring said brake valve.

6. In a train control mechanism, the combination of an engineer's valve of the equalizing discharge type, including an equalizing reservoir; a motor serving when energized to shift said engineer's valve to service application position and prevent its return in releasing direction; a control device for controllng the energization of said motor; means for actuating said control device from stations along the track; a pressure actuated device controlled by the pressure in said equalizing reservoir, rendered operative by the functioning of said actuating means upon said control device, and serving to deenergize said motor when said reservoir pressure is lowered a chosen amount; a speed controlled switch mechanism responsive to train speed; a neutralizing circuit including a manually operable switch which the engineer may operate to counteract the response of said control device to actuation by said track stations; and connections whereby said speed controlled switch mechanism serves to suspend the functioning of said neutralizing circuit above a chosen speed.

7. In a train control mechanism, the combination of an engineer's valve of the equalizing discharge type including an equalizing reservoir; a motor serving when energized to shift said engineer's valve to service application position and prevent its return in releasing direction; a control device for controlling the energization of said motor; means for actuating said control device in response to caution and danger indications at stations along the track; a pressure actuated device controlled by the pressure in said equalizing reservoir, rendered operative by the functioning of said actuating means upon said control device, and serving to deenergize said motor when said reservoir pressure is lowered a chosen amount; a speed controlled switch mechanism responsive to train speed; a neutralizing circuit including a manually operated switch which the engineer may operate to counteract the response of said control device to danger indications; a second neutralizing circuit including a manually operated switch which the engineer may operate to counteract the response of said control device to caution indications; and connections whereby said speed controlled switch mechanism serves to suspend the functioning of the first neutralizing circuit above a certain speed, and of the second neutralizing circuit above a higher speed.

8. In a train control mechanism, the combination of an engineer's valve of the equalizing discharge type including an equalizing reservoir; a motor serving when energized to shift said engineer's valve to service application position and prevent its return in releasing directon; a control device for controlling the energization of said motor; means for actuating said control device from stations along the track; means operated by said actuating means and arranged to confine a portion of the pressure fluid in said reservoir; a device operated by the pressure differential between the confined fluid and the remaining fluid in the reservoir and serving to deenergize said motor when said differential exceeds a chosen value; a speed controlled switch mechanism responsive to train speed; a neutralizing circuit including a manually operable switch which the engineer may operate to counteract the response of said control device to actuation by said track stations; and connections whereby said speed controlled switch mechanism serves to suspend the functioning of said neutralizing circuit above a chosen speed.

9. In a train control mechanism, the combination of an engineer's valve of the equalizing discharge type including an equalizing reservoir; a motor serving when energized to shift said engineer's valve to service application position and prevent its return in releasing direction; a control device for controlling the energization of said motor; means for actuating said control device in response to caution and danger indications at stations along the track; means operated by said actuating means and arranged to confine a portion of the pressure fluid in said reservoir; a device operated by the pressure differential between the confined fluid and the remaining fluid in said reservoir and serving to deenergize said motor when said differential exceeds a chosen value; a speed controlled switch mechanism responsive to train speed; a neutralizing circuit including a manually operated switch which the engineer may operate to counteract the response of said control device to danger indications; a second neutralizing circuit including a manually operated switch which the engineer may operate to counteract the response of said control device to caution indications; and connections whereby said speed controlled switch mechanism serves to suspend the functioning of the first neutralizing circuit above a certain speed, and of the second neutralizing circuit above a higher speed.

10. In a train control device, the combination of brake applying means; a pair of normally excited relays each serving upon deenergization to actuate said brake applying means; inductive means for selectively deenergizing said relays from stations along the track in response to danger and caution indications; individual resetting circuits for said relays, each including a corresponding manually operable switch accessible to the engineer; and speed controlled switch mechanism controlling said resetting circuits and serving to suspend the functions of said circuits above corresponding and different train speeds.

11. In a train control mechanism, the combination of an engineer's valve of the equalizing discharge type including an equalizing reservoir; a pneumatic motor serving when under pressure to shift said valve to service application positions and to prevent its return in releasing direction; an electrically actuated valve normally excited to relieve said motor of pressure; a relay switch operable to destroy the excitation of said electrically actuated valve; inductive means for actuating said relay switch from stations along the track; and a pressure actuated device controlled by the pressure in said equalizing reservoir, rendered operative by said relay switch when the latter destroys the excitation of said electrically actuated valve, and serving to reexcite said electrically actuated valve when reservoir pressure is lowered a chosen amount.

12. In a train control mechanism, the combination of an engineer's valve of the equalizing discharge type including an equalizing reservoir; a pneumatic motor serving when under pressure to shift said valve to service application position and to prevent its return in releasing direction; an electrically actuated valve normally excited to relieve said motor of pressure; a relay switch operable to destroy the excitation of said electrically actuated valve; inductive means for actuating said relay switch from stations along the track; a second electrically actuated valve caused to close by said relay when the latter destroys the excitation of the first named electrically actuated valve, and serving to confine a portion of the fluid in said reservoir; and a pressure actuated switch arranged to be actuated by the pressure differential between said confined fluid and the other fluid in said reservoir and serving to close an exciting circuit for the first-named electrically actuated valve when said differential exceeds a chosen amount.

13. In a train control mechanism, the combination of an engineer's valve of the equalizing discharge type, including an equalizing reservoir; a pneumatic motor serving when under pressure to shift said engineer's valve to service application position and prevent its return in releasing direction; an electromagnetic valve normally energized to relieve said motor of pressure; a relay controlling the energization of said electromagnetic valve; means on the track for actuating said relay; a second electromagnetic valve arranged to be energized by said relay simultaneously with the deenergization of the first electromagnetic valve and serving when actuated to confine a portion of the fluid in said reservoir; a pressure operated switch arranged to be closed by a chosen pressure differential between said confined fluid and the other fluid in said reservoir; a secondary exciting circuit for the first named electromagnetic valve controlled by said pressure operated switch; a manually controlled reset circuit for said relay; and a speed controlled switch responsive to train speed also interposed in said reset circuit.

14. In a train control mechanism, the combination of an engineer's valve of the equalizing discharge type, including an equalizing reservoir; a pneumatic motor serving when under pressure to shift said engineer's valve to service application position and prevent its return in releasing direction; an electromagnetic valve normally energized to relieve said motor of pressure; a relay controlling the energization of said electromagnetic valve; means on the track for actuating said relay; a second electromagnetic valve arranged to be energized by said relay simultaneously with the deenergization of the first electromagnetic valve and serving when actuated to confine a portion of the fluid in said reservoir; a pressure operated switch arranged to be closed by a chosen pressure differential between said confined fluid and the other fluid in said reservoir; a secondary exciting circuit for the first-named electromagnetic valve controlled by said pressure operated switch; a manually controlled reset circuit for said relay; and a speed controlled switch responsive to train speed, and arranged to interrupt said reset circuit at a chosen speed, and to deenergize the first-named electromagnetic valve at a higher speed.

In testimony whereof we have signed our names to this specification.

ERWIN C. VROMAN.
CHAS. A. CAMPBELL.